US012125347B2

(12) United States Patent
Peterson et al.

(10) Patent No.: US 12,125,347 B2
(45) Date of Patent: Oct. 22, 2024

(54) DROP DOWN MULTIPLIER PANEL

(71) Applicant: IGT, Las Vegas, NV (US)

(72) Inventors: Chris Peterson, Reno, NV (US); Nick Hillstrom, Reno, NV (US); Yu Chong, Reno, NV (US); Nathan Ajhar, Sparks, NV (US)

(73) Assignee: IGT, Las Vegas, NV (US)

( * ) Notice: Subject to any disclaimer, the term of this patent is extended or adjusted under 35 U.S.C. 154(b) by 211 days.

(21) Appl. No.: 17/730,791

(22) Filed: Apr. 27, 2022

(65) Prior Publication Data

US 2023/0351847 A1 Nov. 2, 2023

(51) Int. Cl.
*G07F 17/32* (2006.01)

(52) U.S. Cl.
CPC ...... *G07F 17/3255* (2013.01); *G07F 17/3267* (2013.01)

(58) Field of Classification Search
CPC ........................................................ G07F 17/32
See application file for complete search history.

(56) References Cited

U.S. PATENT DOCUMENTS 8,147,334 B2 4/2012 Gatto et al.
8,764,566 B2 7/2014 Miltenberger et al.
2004/0077422 A1* 4/2004 Bryant ................ G07F 17/3255 472/137
2020/0126367 A1* 4/2020 Bosak ..................... G07F 17/34
2020/0294359 A1* 9/2020 Bulzacki ............. G07F 17/3225
2021/0264724 A1* 8/2021 Decasa, Jr. ............. G06F 7/588
2021/0375096 A1* 12/2021 Sanborn .............. G07F 17/3213
2022/0284774 A1* 9/2022 Bolling, Jr. ......... G07F 17/3213
2023/0107076 A1* 4/2023 Crow .................. G07F 17/3209 463/20

* cited by examiner

*Primary Examiner* — Omkar A Deodhar
(74) *Attorney, Agent, or Firm* — Sheridan Ross P.C.

(57) ABSTRACT

In certain embodiments, the present disclosure relates to or gaming system providing a game enhancement feature. The electronic game can be conducted on a plurality of rows and a plurality of columns of a grid and a variable plurality of symbols can be presented in the plurality of rows and the plurality of columns of the grid. When the game enhancement feature of the electronic game is activated, an indication of the game enhancement feature can be provided to a player of the electronic game. A determination of an outcome of the electronic game can be made based on the variable plurality of symbols presented in the plurality of rows and the plurality of columns of the grid upon termination of the electronic game and the determined outcome of the electronic game can be modified based on the game enhancement feature.

20 Claims, 6 Drawing Sheets

DROP DOWN MULTIPLIER PANEL

BACKGROUND

The present disclosure is generally directed to gaming system and, in particular, toward gaming systems that implement game enhancement features such as variably and/or intermittently presented multipliers that can modify the outcome of an electronic game.

Gaming machines typically offer a number of built-in game play features that contribute to the overall player experience. Any type of game play functionality that presents additional variable elements, some of which may increase a player's chances of winning, is often viewed as desirable since it can increase player engagement and can lead to increased play of the gaming machine.

BRIEF SUMMARY

In certain embodiments, the present disclosure relates to a gaming system providing a game enhancement feature. According to one embodiment, a method for operating an electronic game on a gaming system can comprise initiating, by the processor of the gaming system, the electronic game. The electronic game can be conducted on a plurality of rows and a plurality of columns of a grid and a variable plurality of symbols can be presented in the plurality of rows and the plurality of columns of the grid.

A determination can be made, by the processor of the gaming system, as to whether to activate a game enhancement feature of the electronic game. For example, determining whether to activate the game enhancement feature of the electronic game can be based on a pseudo-random event. In another example, determining whether to activate the game enhancement feature of the electronic game can be based on a current context of the electronic game. In yet another example, determining whether to activate the game enhancement feature of the electronic game can be based on a loyalty program of a gaming venue in which the player of the electronic game is enrolled. In a further example, determining whether to activate the game enhancement feature of the electronic game can be based on a promotion conducted by a gaming venue in which the gaming system is installed. In response to determining to activate the game enhancement feature of the electronic game, an indication that the game enhancement feature of the electronic game is activated can be provided by the processor of the gaming system to a player of the electronic game.

A determination of an outcome of the electronic game can be made, by the processor of the gaming system, based on the variable plurality of symbols presented in the plurality of rows and the plurality of columns of the grid upon termination of the electronic game. The determined outcome of the electronic game can be modified, by the processor of the gaming system, based on the game enhancement feature. For example, determining the outcome of the electronic game based on the variable plurality of symbols presented in the plurality of rows and the plurality of columns of the grid upon termination of the electronic game can be based on the variable plurality of symbols presented in a single row of the plurality of rows. In such cases, modifying the determined outcome of the electronic game can be based on the variable plurality of symbols presented in a single column of the plurality of columns corresponding to the provided indication that the game enhancement feature of the electronic game is activated. In another example, determining the outcome of the electronic game based on the variable plurality of symbols presented in the plurality of rows and the plurality of columns of the grid upon termination of the electronic game can be based on the variable plurality of symbols presented in a single column of the plurality of columns. In such cases, modifying the determined outcome of the electronic game can be based on the variable plurality of symbols presented in a single row of the plurality of rows corresponding to the provided indication that the game enhancement feature of the electronic game is activated.

According to another embodiment, a gaming system can comprise a display device, a processor coupled with the display, and a memory coupled with and readable by the processor. The processor can store therein a set of instructions which, when executed by the processor, causes the processor to display, on the display device, a grid of an electronic game. The grid can comprise a plurality of rows and a plurality of columns. For example, the electronic game can comprise video slots, video poker, or another game played using a set of symbols presented on a grid. The instructions can further cause the processor to initiate execution of the electronic game. During execution of the electronic game, the instructions can cause the processor to present a variable plurality of symbols in the plurality of rows and the plurality of columns of the grid on the display.

The instructions can further cause the processor to determine, during execution of the electronic game, whether to activate a game enhancement feature of the electronic game, in response to determining to activate the game enhancement feature of the electronic game, display, on the display device adjacent to the grid, an indication that the game enhancement feature of the electronic game is activated, determine an outcome of the electronic game based on the variable plurality of symbols presented in the plurality of rows and the plurality of columns of the grid upon termination of the electronic game, and modify the determined outcome of the electronic game based on the game enhancement feature.

For example, determining the outcome of the electronic game based on the variable plurality of symbols presented in the plurality of rows and the plurality of columns of the grid upon termination of the electronic game can be based on the variable plurality of symbols presented in a single row of the plurality of rows. In such cases, displaying the indication that the game enhancement feature of the electronic game is activated can comprise displaying a row of a plurality of indicators corresponding to each column of the plurality of columns of the grid. Modifying the determined outcome of the electronic game can then be based on the variable plurality of symbols presented in a single column of the plurality of columns and the corresponding indicator of the plurality of indicators in the provided indication that the game enhancement feature of the electronic game is activated. In such cases, the indication that the game enhancement feature of the electronic game is activated can comprise, for example, an indication of a multiplier corresponding to each column of the plurality of columns of the grid and modifying the determined outcome of the electronic game can comprise increasing a payout of the electronic game by the multiplier corresponding to the single column.

In another example, determining the outcome of the electronic game based on the variable plurality of symbols presented in the plurality of rows and the plurality of columns of the grid upon termination of the electronic game can be based on the variable plurality of symbols presented in a single column of the plurality of columns. In such cases, displaying the indication that the game enhancement feature of the electronic game is activated can comprise displaying a column of a plurality of indicators corresponding to each row of the plurality of rows of the grid. Modifying the determined outcome of the electronic game can then be based on the variable plurality of symbols presented in a single row of the plurality of columns and the corresponding indicator of the plurality of indicators in the provided indication that the game enhancement feature of the electronic game is activated. In such cases, the indication that the game enhancement feature of the electronic game is activated can comprise, for example, an indication of a multiplier corresponding to each row of the plurality of rows of the grid and modifying the determined outcome of the electronic game can comprise increasing a payout of the electronic game by the multiplier corresponding to the single row.

According to yet another embodiment, a non-transitory, computer-readable medium can comprise a set of instructions which, when executed by a processor, causes the processor to initiate an electronic game on a gaming system. The electronic game can be conducted on a plurality of rows and a plurality of columns of a grid and a variable plurality of symbols can be presented in the plurality of rows and the plurality of columns of the grid. The instructions can cause the processor to determine whether to activate a game enhancement feature of the electronic game. Determining whether to activate the game enhancement feature of the electronic game can be based on a generated pseudo-random number, for example.

In response to determining to activate the game enhancement feature of the electronic game, the instructions can cause the processor to provide to a player of the electronic game, an indication that the game enhancement feature of the electronic game is activated, determine an outcome of the electronic game based on the variable plurality of symbols presented in the plurality of rows and the plurality of columns of the grid upon termination of the electronic game, and modify the determined outcome of the electronic game based on the game enhancement feature. For example, determining the outcome of the electronic game can be based on the variable plurality of symbols presented in a single row of the plurality of rows upon termination of the game and modifying the determined outcome of the electronic game can be based on the variable plurality of symbols presented in a single column of the plurality of columns corresponding to the provided indication that the game enhancement feature of the electronic game is activated. In another example, determining the outcome of the electronic game can be based on the variable plurality of symbols presented in a single column of the plurality of columns upon termination of the game and modifying the determined outcome of the electronic game can be based on the variable plurality of symbols presented in a single row of the plurality of rows corresponding to the provided indication that the game enhancement feature of the electronic game is activated.

Additional features and advantages are described herein and will be apparent from the following Description and the figures.

DETAILED DESCRIPTION

Embodiments of the present disclosure will be described in connection with gaming systems that implement game enhancement features. Generally speaking, the game enhancement features can modify the outcome of an electronic game. For example, the game enhancement features can comprise multipliers that modify a payout of the electronic game. In some examples described herein, the game enhancement features can be enabled by default or can be variably and/or intermittently enabled, for example, based on a game play history of other factors. The game enhancement features can increase player engagement and can lead to increased play of the gaming system.

Gaming systems described herein may include a video poker system, a slot machine, or Electronic Gaming Machine (EGM), that implements the described game enhancement features. While embodiments of the present disclosure will be described in connection with the example of a slot machine, video poker system, or EGM implementing game enhancement features, it should be appreciated that embodiments of the present disclosure are not so limited. For instance, a gaming system as described herein can be implemented on other types of computational devices, such as portable user devices, smartphones, tablets, laptops, Personal Computers (PCs), wearable devices, etc. Among other things, embodiments of the present disclosure provide a player with more ways to win a game, heightened anticipation during gameplay, the ability to alter the chances of winning in a game, the ability to alter the payout amount for a winning game outcome, and add excitement to the overall game-playing experience of games.

Figure 1:
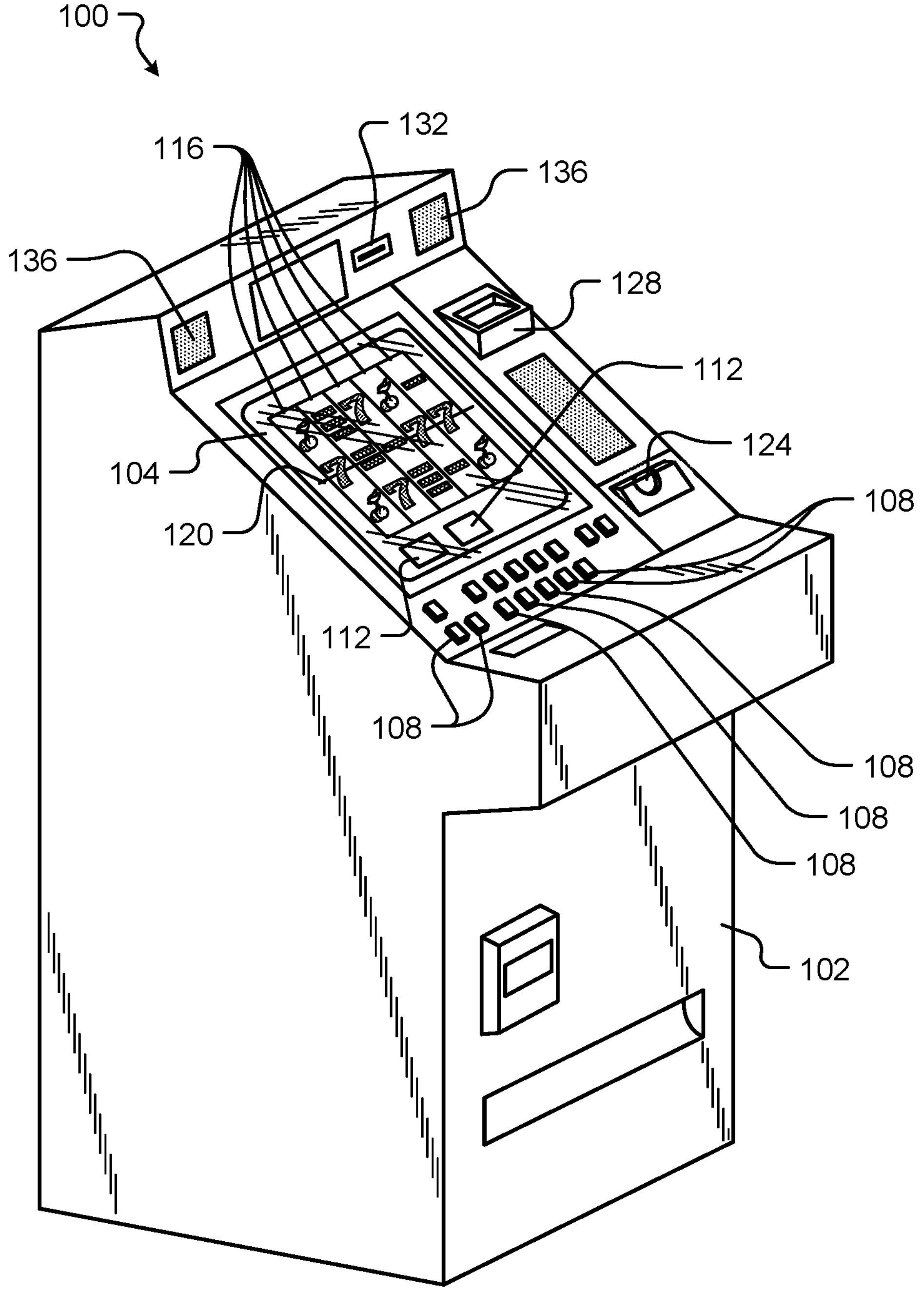
FIG. 1 is a diagram illustrating an exemplary gaming system in which embodiments of the present disclosure may be implemented.

FIG. 1 is a diagram illustrating an exemplary gaming system in which embodiments of the present disclosure may be implemented. More specifically, FIG. 1 illustrates a gaming system 100 that may be used to implement a hold and respin game or the like in which game enhancement features may be implemented. A gaming system 100 may include a portable or non-portable device used for executing a gaming application or multiple different gaming applications without departing from the scope of the present disclosure. Non-limiting examples of a gaming system can include, but are not limited to, an EGM, a Video Gaming Machine (VGM), a mobile communication device (e.g., a smartphone, laptop, tablet, wearable device, etc.), a personal computer (PC), etc. An EGM or VGM-type of gaming system 100 is shown in FIG. 1 in accordance with embodiments of the present disclosure.

The illustrative gaming system 100 of FIG. 1 is shown to include a support structure, housing or cabinet 102 which provides support for a plurality of displays, inputs, controls and other features of a conventional gaming machine. In the illustrated embodiment, a player can play the gaming system 100 while sitting. However, the gaming system 100 can be alternatively configured so that a player can operate it while standing or sitting. The illustrated gaming system 100 can be positioned on the floor but can be positioned alternatively (i) on a base or stand, (ii) as a pub-style table-top game, (iii) as a stand-alone gaming system on the floor of a casino with other stand-alone gaming system, or (iv) in any other suitable manner. The gaming system 100 can be constructed with varying cabinet and display configurations.

In one embodiment, a gaming system 100 can be configured to randomly generate awards and/or other game outcomes based on probability data. Since a gaming system 100 can generate outcomes randomly or based upon a probability calculation, there is no certainty that the gaming system 100 will provide the player with any specific award or other game outcome.

In some embodiments, a gaming system 100 may employ a predetermined or finite set or pool of awards, progressive awards, prizes or other game outcomes. In such an embodiment, as each award or other game outcome is provided to the player, the gaming system 100 removes the provided award or other game outcome from the predetermined set or pool. Once removed from the set or pool, the specific provided award or other game outcome cannot be provided to the player again. The gaming system 100 may provide players with some or all of the available awards or other game outcomes over the course of a play cycle and may or may not guarantee a designated number of actual wins and losses.

The gaming system 100 may include one or more displays 112. An illustrative display 112 may include a credit display that displays a player's current number of credits, cash, account balance or the equivalent. Another illustrative display 112 may include a bet display that displays a player's amount wagered.

The gaming system 100 is also shown to include at least one payment acceptor. Illustrative payment acceptors may include, without limitation, a coin slot 124, where the player inserts coins or tokens, and a ticket, note, or bill acceptor 128, where the player inserts a bar-coded ticket, note, or cash. In one embodiment, a player-tracking card, credit card, debit card, or data card reader/validator 132 is also provided for accepting any of those or other types of cards as a form of payment toward playing a game on the gaming system 100.

In one embodiment, a player inserts an identification card into card reader 132 of gaming system 100. The identification card can be a smart card having a programmed microchip or a magnetic strip coded with a player's identification, credit totals, and other relevant information. In one embodiment, money may be transferred to a credit meter of the gaming system 100 through an electronic fund transfer and card reader 132 using the player's credit, debit, or smart card. When a player funds the gaming system 100, a processor of the gaming system 100 may determine the amount of funds entered and the corresponding amount is shown on the credit or other suitable display 112 as described herein.

In one embodiment, after appropriate funding of gaming system 100, the player presses an input device 108 to initiate game play. The input devices 108 may include various types of buttons, levers, gesture inputs, cameras, etc., that enable a player to start any game play or sequence of events. In one embodiment, upon appropriate funding, gaming system 100 begins game play automatically. In another embodiment, the player may be required to actuate or activate one of the play buttons to initiate play of gaming system 100. Other non-limiting types of input devices 108 may include a "bet one" button, a "max bet" button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button. In some embodiments, the player places a bet by pushing a "bet one" button (e.g., betting an amount equal to one credit for the next play). The player may increase the player's wager by one credit each time the player pushes "bet one" button. When the player pushes the "bet one" button, the number of credits shown in the credit display decreases by one, and the number of credits shown in the bet display increases by one. A "max bet" button can also be provided, which enables the player to bet the maximum wager (e.g., max lines, max wager per line, and re-spin operation). The gaming system 100 may include other suitable wager buttons, such as a "repeat bet" button (e.g., repeating the bet made from the immediately last play of the gaming system 100 for the next play of the gaming system 100), one or more "select paylines" buttons, a "select re-spin operation" button, and one or more "select wager per payline" buttons.

Another type of input device 108 that may be provided on the gaming system 100 is a physical cash out button, a virtual cash out button, a selectable GUI element, or the like. The player presses a cash out button and cashes-out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The gaming system 100 may also include one or more display screens 104 and one or more sound generating devices 136. The combination of outputs provided on a display screen 104 and sound generating device 136 may contribute to the game play experience and, in some embodiments, may provide the player with information regarding a status of a game play event or sequence of events.

In one embodiment, the sound generating device 136 may include at least one speaker or other type of transducer for generating audible sounds, playing music, etc. In one embodiment, a gaming system 100 can provide dynamic sounds coupled with attractive multimedia images displayed on the display screen 104 to provide an audio-visual representation or to otherwise display full-motion video with sound to attract players to the gaming system 100. During idle periods, the gaming system 100 displays a sequence of audio and/or visual attraction messages to attract potential players to the gaming system 100.

In one embodiment, a base or primary game can include a slot game with one or more paylines 120. As will be discussed in further detail herein, the game provided by the gaming system 100 may support one or multiple paylines 120, which may extend across the display screen 104 vertically, horizontally, diagonally, at adjusted angles, etc. In some embodiments, such as for a slot game, a payline 120 intersects a plurality of reels 116, such as three to five reels. Each reel 116 may be used to display different sets of symbols in connection with game play activity provided by the gaming system 100. In some embodiments, each reel 116 may operate independent of all other reels and the symbols displayed by a reel 116 at the end of a given spin may depend upon random numbers generated by the gaming system 100. The positions of symbols on each reel 116 and in the combination of reels 116 may form the array of symbols distributed throughout an array of cells. The distribution of symbols may be presented in a presentation order rendered to the display screen 104 of the gaming system 100.

The reels 116 may be provided in video form with simulated reels being displayed via the display screen 104. A reel 116 may be used to display any number of symbols such as bells, hearts, fruits, numbers, letters, bars or other images and symbols, which could correspond to a theme associated with a game provided by the gaming system 100. The gaming system 100 may be configured to award prizes, awards, or other game play opportunities when the reels 116 stop spinning and a particular symbol combination is intersected by an active payline 120 (e.g., a payline 120 that is currently being wagered and is subject to evaluation for a win after the reels 116 have stopped spinning and a distribution of symbols is finalized).

Figure 2:
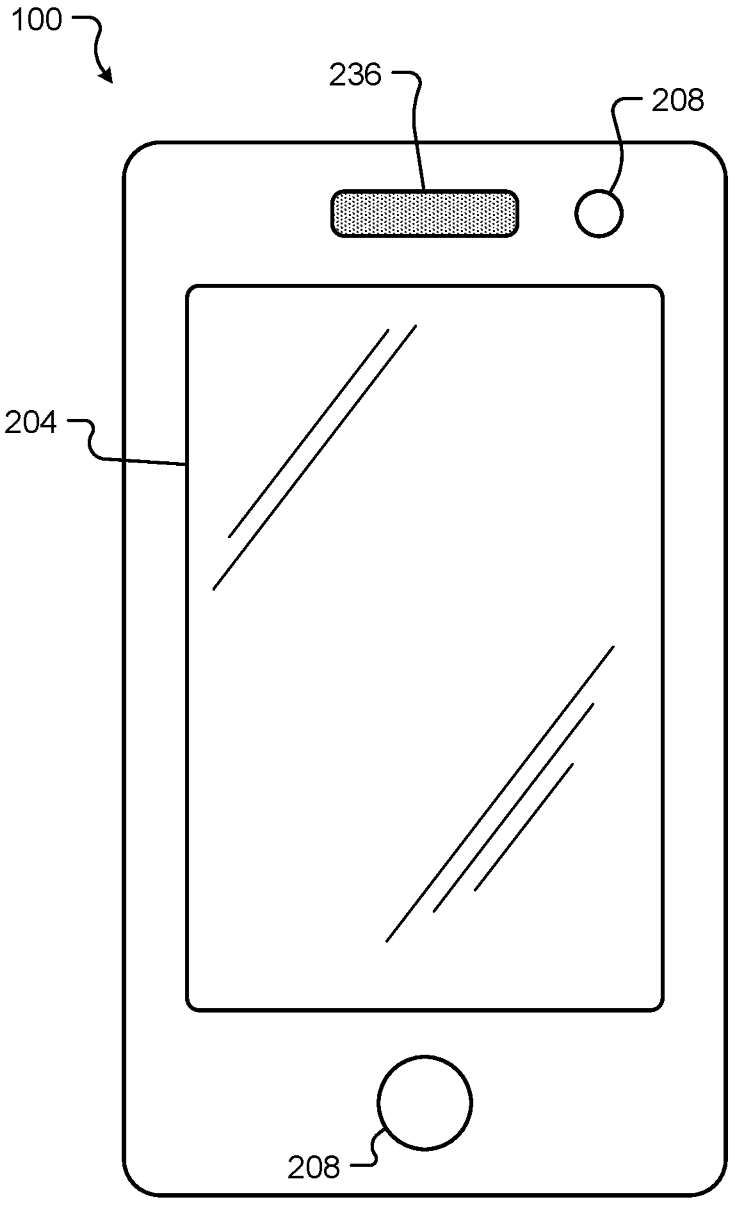
FIG. 2 is a diagram illustrating another exemplary gaming system in which embodiments of the present disclosure may be implemented.

FIG. 2 is a diagram illustrating another exemplary gaming system in which embodiments of the present disclosure may be implemented. As illustrated in this example, the gaming system 100 may be implemented by software executing on a portable gaming system 100 such as a mobile smartphone, tablet, wearable, etc. The gaming system 100 may be owned by a user of the device rather than being owned by a casino operator. In other embodiments, the portable gaming system 100 may be owned by a casino operator and provided to a player for an amount of time, possibly under an agreement between the casino operator and the player. As an example, the portable gaming system 100 may be assigned to the player for a duration of their visit or stay at the casino, but the portable gaming system 100 may be returned by the player back to the casino operator after the visit or stay has concluded.

The gaming system 100 includes a display screen 204, a plurality of input devices 208, and at least one speaker 236. In some embodiments, the display screen 204 may correspond to a touch-sensitive display screen, meaning that the display screen 204 is simultaneously capable of displaying information (e.g., in connection with game play activity) and receiving a user input. In some embodiments, the touch-sensitive display screen 204 may provide game features similar to a cabinet-style gaming system 100 without requiring all of the dedicated buttons provided by a cabinet-style gaming system 100.

As introduced above, the gaming system 100 can execute am electronic game such as slots, video poker, or other such game. Additionally, the gaming system 100 can provide game enhancement features that can modify the outcome of an electronic game. For example, the game enhancement features can comprise graphical or other visual indicators that appear when the game enhancement feature is enabled. The game enhancement features can indicate a win or a possibility of a win in a manner different from the ordinary way in which a win is detected or determined for the game. In some cases, the graphical or visual indicators can comprise multipliers that modify a payout of the electronic game.

Figure 3:
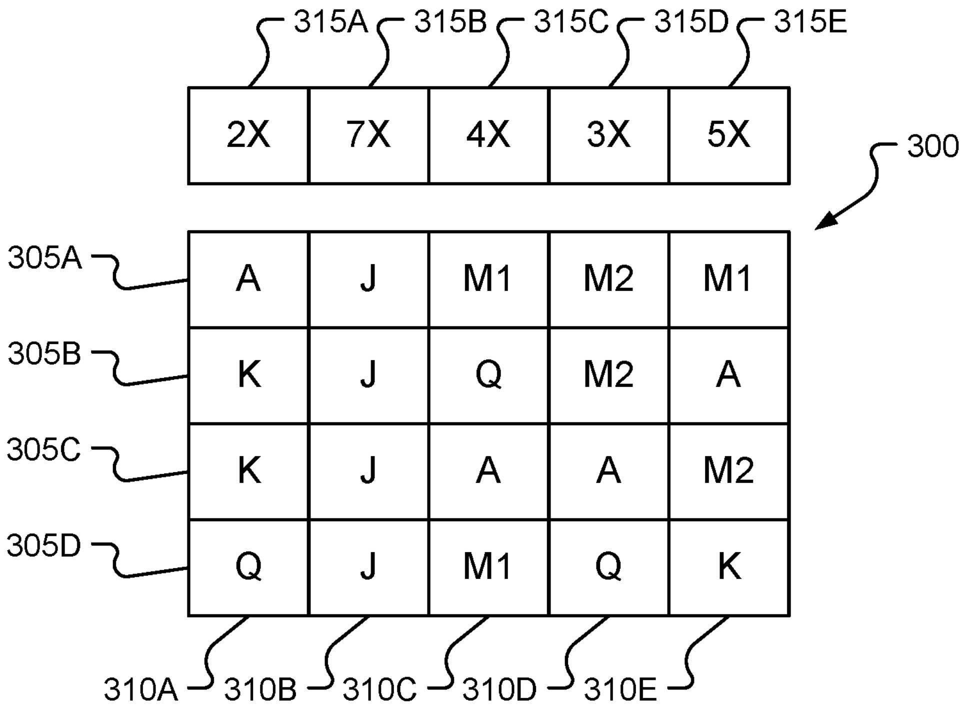
FIG. 3 is a diagram illustrating implementation of a game enhancement feature on an electronic game according to one embodiment of the present disclosure.

FIG. 3 is a diagram illustrating implementation of a game enhancement feature on an electronic game according to one embodiment of the present disclosure. More specifically, this example illustrates a grid 300 which can be displayed by the gaming system and upon which an electronic game is played. Examples of electronic games played on such a grid can include, but are not limited to, slots, grid slots, video poker, etc. The grid 300 can comprise a plurality of rows 305A-305D and a plurality of columns 310A-310E. As known, a variable plurality of symbols can be presented in the plurality of rows and the plurality of columns of the grid while the electronic game can be conducted and an outcome of the game can be determined based on the symbols appearing on the grid 300 at the termination of the game. For example, the game may be row-based or column-based. In a row-based game, the outcome of the electronic game can be determined based on the symbols presented in one or more rows of the plurality of rows 305A-305D. In a column-based game, the outcome of the electronic game can be determined based on the symbols presented in one or more columns of the plurality of columns 310A-310E.

When a game enhancement feature as described herein is activated or enabled, a graphical or visual indication can be made. For example, the indication that the game enhancement feature of the electronic game is activated can comprise displaying above or below the grid 300 a row comprising a plurality of indicators 315A-315E. Each indicator 315A-315E can correspond to a column of the plurality of columns 310A-310E of the grid 300. Modifying the determined outcome of the electronic game can then be based on the plurality of indicators 315A-315E. For example, if the game is row-based and even if none of the rows 305A-305D contain symbols corresponding to a win, a win can be detected is a column 310B based on the symbols appearing therein. As illustrated in this example, the indications 315A-315E can each comprise an indication of a multiplier corresponding to each column of the plurality of columns 310A-310E of the grid 300. In such cases, or in cases where the game is column-based, the determined outcome of the electronic game can comprise increasing a payout of the electronic game by the multiplier corresponding to the column 310B in which the winning symbols are detected. In other cases, the indicators 315A-315E can comprise one or more lights or symbols presented above or below the grid 300 to indicate one or more columns of the plurality of columns 310A-310E for which the game enhancement feature is enabled, e.g., indicating one or more columns in which a win may be detected even if the game is row-based.

Figure 4:
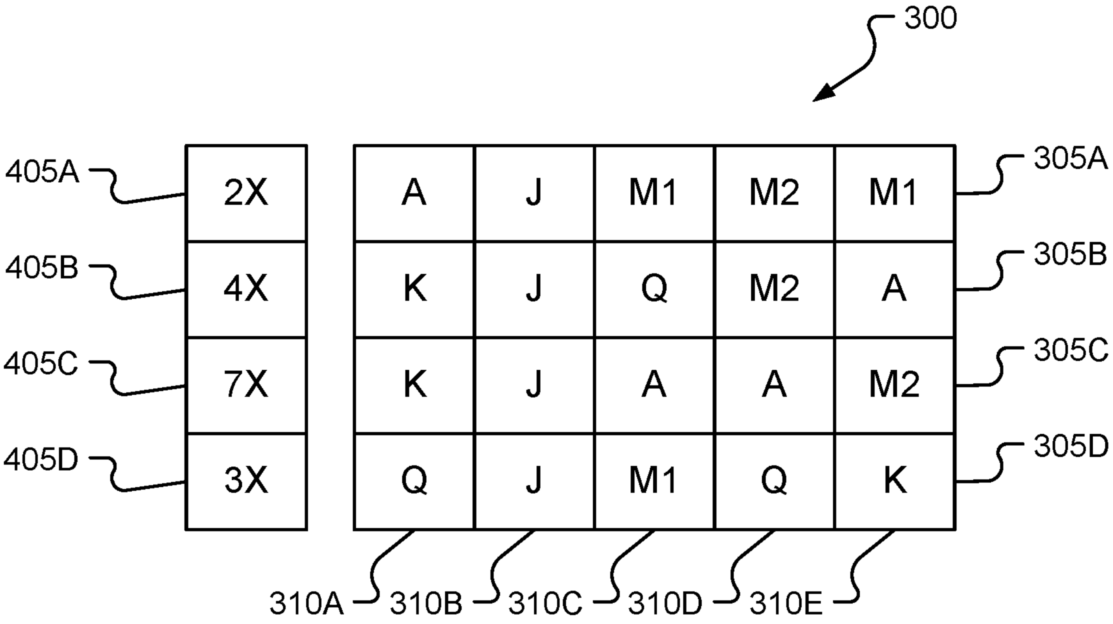
FIG. 4 is a diagram illustrating implementation of a game enhancement feature on an electronic game according to another embodiment of the present disclosure.

FIG. 4 is a diagram illustrating implementation of a game enhancement feature on an electronic game according to another embodiment of the present disclosure. More specifically, this example illustrates the grid 300 as described above. In this case, a plurality of indicators 405A-405D can be presented in column along the right or left side of the grid 300. Similar to above, each indicator 405A-405D can correspond to a row of the plurality of rows 305A-305D of the grid 300. Modifying the determined outcome of the electronic game can then be based on the plurality of indicators 405A-405D. For example, if the game is column-based and even if none of the columns 310A-310E contain symbols corresponding to a win, a win can be detected is a row of the plurality of rows 305A-305D based on the symbols appearing therein. As illustrated in this example, the indicators 405A-405D can each comprise an indication of a multiplier corresponding to each row of the plurality of rows 305A-305D of the grid 300. In such cases, or in cases where the game is row-based, the determined outcome of the electronic game can comprise increasing a payout of the electronic game by the multiplier corresponding to the column 310B in which the winning symbols are detected. In other cases, the indicators 405A-405D can comprise one or more lights or symbols presented to the right or left of the grid 300 to indicate one or more rows of the plurality of rows 305A-

305D for which the game enhancement feature is enabled, e.g., indicating one or more rows in which a win may be detected even if the game is column-based.

Figure 5:
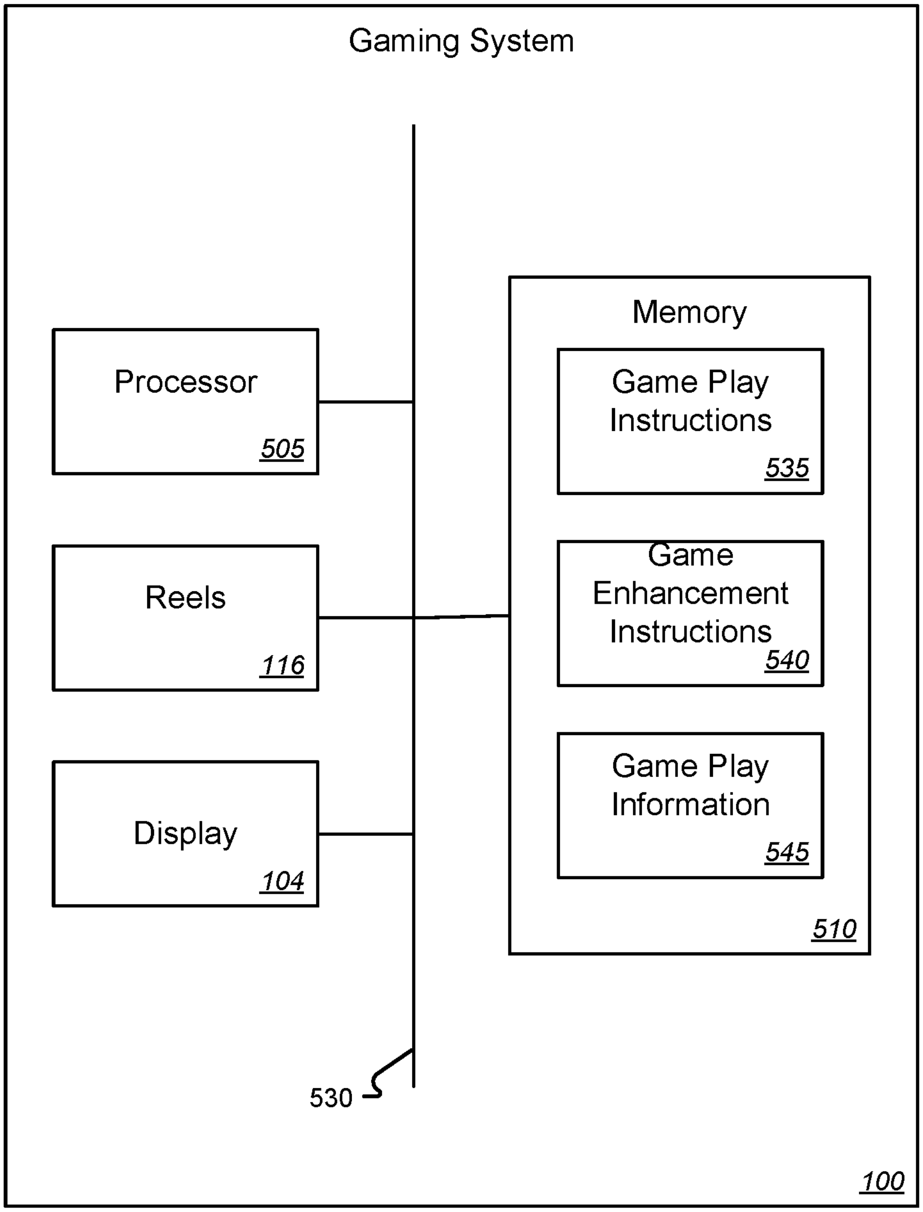
FIG. 5 is a block diagram illustrating additional details of components of an exemplary gaming system according to one embodiment of the present disclosure.

FIG. 5 is a block diagram illustrating additional details of components of an exemplary gaming system according to one embodiment of the present disclosure. As illustrated in this example, the gaming system 100 can comprise a processor 505. The processor 505 may correspond to one or many computer processing devices. For instance, the processor 505 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 505 may be provided as a microprocessor, Central Processing Unit (CPU), or plurality of microprocessors that are configured to execute the instructions sets stored in a memory 510. Upon executing the instruction sets stored in memory 510, the processor 505 enables various functions of the gaming system 100 as described herein.

The memory 510 can be coupled with and readable by the processor 505 via a communications bus 530. The memory 510 may include any type of computer memory device or collection of computer memory devices. Non-limiting examples of memory 510 include Random Access Memory (RAM), Read Only Memory (ROM), flash memory, Electronically-Erasable Programmable ROM (EEPROM), Dynamic RAM (DRAM), etc. The memory 510 may be configured to store the instruction sets depicted in addition to temporarily storing data for the processor 505 to execute various types of routines or functions.

The processor 505 can also be coupled with one or more one or more reels 116A-116C and/or a display 104. As noted above, the reels 116A-116C may comprise physical elements of the gaming system 100 or may be graphically represented on a display 104. In such cases, the display 104 can comprise, for example, a Liquid Crystal Display (LCD), Light Emitting Diode (LED), Organic Light Emitting Diode (OLED), Plasma Display Panel (PDP), Cathode Ray Tube (CRT) display or other type of display for presenting video images.

The memory 510 can store therein sets of instructions which, when executed by the processor 505, cause the processor 505 to operate an electronic game as described herein. More specifically, the memory 510 can store therein a set of game play instructions 535 which, when executed by the processor 505, can cause the processor 505 to initiate rotation of the reels 116A-116C and/or present a grid 300 on the display 104. The game play instructions 535 can cause the processor 505 to rotate each reel 116A-116C and/or present a variety of symbols on a grid 300 as described above independently for different amounts of time.

The memory 510 can also store therein a set of game enhancement instructions 540 which, when executed by the processor 505, can cause the processor 505 to determine, during execution of the electronic game, whether to activate a game enhancement feature of the electronic game. For example, determining whether to activate the game enhancement feature of the electronic game can be based on a pseudo-random event. In another example, determining whether to activate the game enhancement feature of the electronic game can be based on a game play information 545 maintained in the memory 510. For example, the game play information 545 can indicate current context of the electronic game such as number of spins, amount of a wager, etc. In yet another example, determining whether to activate the game enhancement feature of the electronic game can be based on a loyalty program of a gaming venue in which the player of the electronic game is enrolled. In a further example, determining whether to activate the game enhancement feature of the electronic game can be based on a promotion conducted by a gaming venue in which the gaming system is installed.

The game enhancement instructions 540, when executed by the processor 505, can further cause the processor 505, in response to determining to activate the game enhancement feature of the electronic game, to present an indication that the game enhancement feature of the electronic game is activated. As described above, indication that the game enhancement feature of the electronic game is activated can comprise a plurality of indicators 315A-315E or 405A-405D as described presented on the display 104 alongside of the grid 300 or otherwise next to the reels 116.

The game enhancement instructions 540, when executed by the processor 505, can further cause the processor 505 to determine an outcome of the electronic game based on the variable plurality of symbols presented in the plurality of rows 305A-305D and the plurality of columns 315A-315E of the grid 300 upon termination of the electronic game and modify the determined outcome of the electronic game based on the game enhancement feature. As described above, modifying the outcome of the game can comprise any of identifying a win in a row of a column-based game, identifying a win in a column of a row-based game, applying a multiplier to a payout for a win identified in a row or column of the grid 300, and/or any combination thereof.

Figure 6:
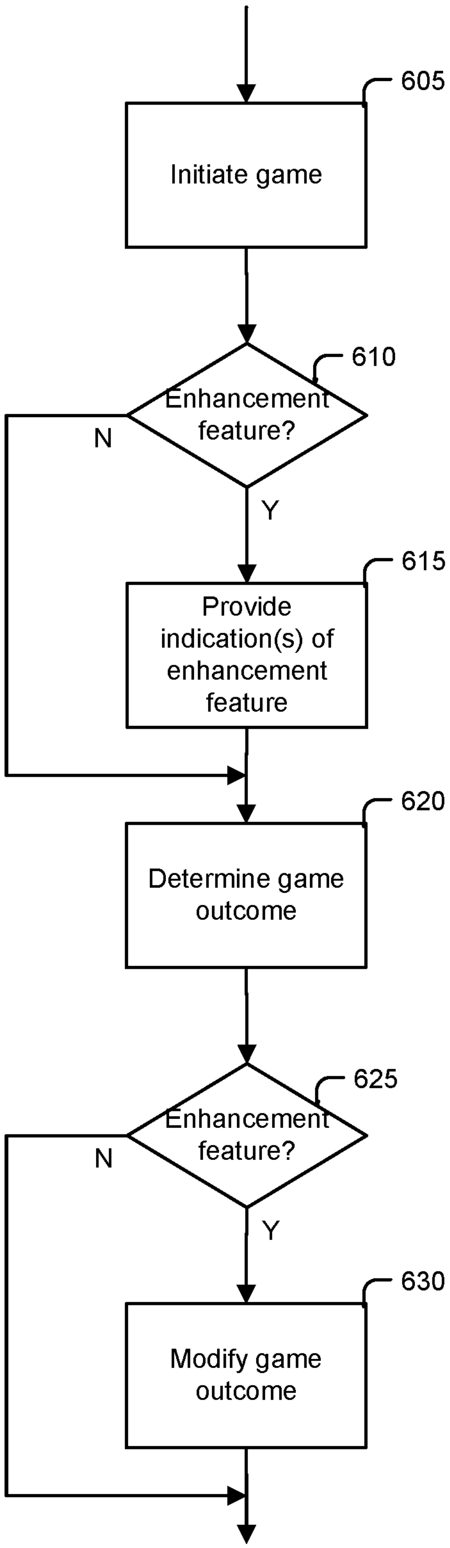
FIG. 6 is a flowchart illustrating an exemplary process for implementing a game enhancement feature on an electronic game according to one embodiment of the present disclosure.

FIG. 6 is a flowchart illustrating an exemplary process for implementing a game enhancement feature on an electronic game according to one embodiment of the present disclosure. As illustrated in this example, operating an electronic game can comprise initiating 605 the electronic game. As described above, the electronic game can be conducted on a plurality of rows 305A-305D and a plurality of columns 315A-315E of a grid 305 and a variable plurality of symbols can be presented in the plurality of rows 305A-305D and the plurality of columns 315A-315E of the grid 300.

A determination 610 can be made as to whether to activate a game enhancement feature of the electronic game. For example, determining 610 whether to activate the game enhancement feature of the electronic game can be based on a pseudo-random event. In another example, determining 610 whether to activate the game enhancement feature of the electronic game can be based on a current context of the electronic game. In yet another example, determining 610 whether to activate the game enhancement feature of the electronic game can be based on a loyalty program of a gaming venue in which the player of the electronic game is enrolled. In a further example, determining 610 whether to activate the game enhancement feature of the electronic game can be based on a promotion conducted by a gaming venue in which the gaming system is installed.

In response to determining 610 to activate the game enhancement feature of the electronic game, an indication that the game enhancement feature of the electronic game is activated can be provided 615 by the processor of the gaming system to a player of the electronic game. As described above, providing 615 an indication that the game enhancement feature of the electronic game is activated can comprise displaying a plurality of indicators 315A-315E or 405A-405D as described presented on the display 104 alongside of the grid 300 or otherwise providing graphical and/or visual indications next to the grid 300.

An outcome of the electronic game can be determined 620 based on the variable plurality of symbols presented in the plurality of rows 305A-305D and the plurality of columns 315A-315E of the grid 300 upon termination of the electronic game. A further determination 625 can be made as to whether the game enhancement feature was enabled or activated. In response to determining 625 that the game enhancement feature was enabled or activated, the determined 620 outcome of the electronic game can be modified 630 based on the game enhancement feature. For example, determining 620 the outcome of the electronic game based on the variable plurality of symbols presented in the plurality of rows 305A-305D and the plurality of columns 315A-315E of the grid 300 upon termination of the electronic game can be based on the variable plurality of symbols presented in a single row of the plurality of rows 305A-305D. In such cases, modifying 630 the determined outcome of the electronic game can be based on the variable plurality of symbols presented in a single column of the plurality of columns 315A-315E corresponding to the provided indication that the game enhancement feature of the electronic game is activated, i.e., a win can be determined in a column of a row-based game, for example. In another example, determining 620 the outcome of the electronic game based on the variable plurality of symbols presented in the plurality of rows 305A-305D and the plurality of columns 315A-315E of the grid 300 upon termination of the electronic game can be based on the variable plurality of symbols presented in a single column of the plurality of columns 315A-315E. In such cases, modifying 630 the determined outcome of the electronic game can be based on the variable plurality of symbols presented in a single row of the plurality of rows 305A-305D corresponding to the provided indication that the game enhancement feature of the electronic game is activated, i.e., a win can be determined in a row of a column-based game, for example. Additionally, or alternatively, modifying 630 the outcome of the game can comprise applying a multiplier to a payout for a win identified in a row of a row-based game, a column of a row-based game, a column of a column-based game, or a row of a column-based game.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for operating an electronic game on a gaming system, the method comprising:

initiating, by a processor of the gaming system, the electronic game, wherein the electronic game is conducted on a plurality of rows and a plurality of columns of a visual representation of a grid and wherein a variable plurality of symbols are presented in the plurality of rows and the plurality of columns of the grid;

determining, by the processor of the gaming system, whether to activate a game enhancement feature of the electronic game;

in response to determining to activate the game enhancement feature of the electronic game, providing, by the processor of the gaming system, to a player of the electronic game, a visual indication that the game enhancement feature of the electronic game is activated, wherein the visual indication that the game enhancement feature is activated comprises a plurality of elements present adjacent to a side of the visual representation of the grid;

determining, by the processor of the gaming system, an outcome of the electronic game based on the variable plurality of symbols presented in the plurality of rows and the plurality of columns of the visual representation of the grid upon termination of the electronic game; and modifying, by the processor of the gaming system, the determined outcome of the electronic game based on the variable plurality of symbols presented in the plurality of rows and the plurality of columns of the visual representation of the grid and the plurality of elements of the provided visual indication that the game enhancement feature is activated.

2. The method of claim 1, wherein determining whether to activate the game enhancement feature of the electronic game is based on a pseudo-random event.

3. The method of claim 1, wherein determining whether to activate the game enhancement feature of the electronic game is based on a current context of the electronic game.

4. The method of claim 1, wherein determining whether to activate the game enhancement feature of the electronic game is based on a loyalty program of a gaming venue in which the player of the electronic game is enrolled.

5. The method of claim 1, wherein determining whether to activate the game enhancement feature of the electronic game is based on a promotion conducted by a gaming venue in which the gaming system is installed.

6. The method of claim wherein 1, wherein determining the outcome of the electronic game based on the variable plurality of symbols presented in the plurality of rows and the plurality of columns of the grid upon termination of the electronic game is based on the variable plurality of symbols presented in a single row of the plurality of rows and wherein modifying the determined outcome of the electronic game is based on the variable plurality of symbols presented in a single column of the plurality of columns corresponding to the provided indication that the game enhancement feature of the electronic game is activated.

7. The method of claim 1, wherein determining the outcome of the electronic game based on the variable plurality of symbols presented in the plurality of rows and the plurality of columns of the grid upon termination of the electronic game is based on the variable plurality of symbols presented in a single column of the plurality of columns and wherein modifying the determined outcome of the electronic game is based on the variable plurality of symbols presented in a single row of the plurality of rows corresponding to the provided indication that the game enhancement feature of the electronic game is activated.

8. A gaming system comprising:

a display device;

a processor coupled with the display; and a memory coupled with and readable by the processor and storing therein a set of instructions which, when executed by the processor, causes the processor to:

display, on the display device, a grid of an electronic game, the grid comprising a plurality of rows and a plurality of columns;

initiate execution of the electronic game wherein, during execution of the electronic game, a variable plurality of symbols are presented in the plurality of rows and the plurality of columns of the grid;

determine, during execution of the electronic game, whether to activate a game enhancement feature of the electronic game;

in response to determining to activate the game enhancement feature of the electronic game, display, on the display device adjacent to a side of the grid, a plurality of elements comprising an indication that the game enhancement feature of the electronic game is activated;

determine an outcome of the electronic game based on the variable plurality of symbols presented in the plurality of rows and the plurality of columns of the grid upon termination of the electronic game; and modify the determined outcome of the electronic game based on the variable plurality of symbols presented in the plurality of rows and the plurality of columns of the visual representation of the grid and the plurality of elements of the provided visual indication that the game enhancement feature is activated.

9. The gaming system of claim 8, wherein determining the outcome of the electronic game based on the variable plurality of symbols presented in the plurality of rows and the plurality of columns of the grid upon termination of the electronic game is based on the variable plurality of symbols presented in a single row of the plurality of rows and wherein displaying the indication that the game enhancement feature of the electronic game is activated comprises displaying a row of a plurality of indicators corresponding to each column of the plurality of columns of the grid.

10. The gaming system of claim wherein 9, wherein modifying the determined outcome of the electronic game is based on the variable plurality of symbols presented in a single column of the plurality of columns and the corresponding indicator of the plurality of indicators in the provided indication that the game enhancement feature of the electronic game is activated.

11. The gaming system of claim 10, wherein the indication that the game enhancement feature of the electronic game is activated comprises an indication of a multiplier corresponding to each column of the plurality of columns of the grid and wherein modifying the determined outcome of the electronic game comprises increasing a payout of the electronic game by the multiplier corresponding to the single column.

12. The gaming system of claim 8, wherein determining the outcome of the electronic game based on the variable plurality of symbols presented in the plurality of rows and the plurality of columns of the grid upon termination of the electronic game is based on the variable plurality of symbols presented in a single column of the plurality of columns and wherein displaying the indication that the game enhancement feature of the electronic game is activated comprises displaying a column of a plurality of indicators corresponding to each row of the plurality of rows of the grid.

13. The gaming system of claim wherein 12, wherein modifying the determined outcome of the electronic game is based on the variable plurality of symbols presented in a single row of the plurality of columns and the corresponding indicator of the plurality of indicators in the provided indication that the game enhancement feature of the electronic game is activated.

14. The gaming system of claim 13, wherein the indication that the game enhancement feature of the electronic game is activated comprises an indication of a multiplier corresponding to each row of the plurality of rows of the grid and wherein modifying the determined outcome of the electronic game comprises increasing a payout of the electronic game by the multiplier corresponding to the single row.

15. The gaming system of claim 8, wherein the electronic game comprises video slots.

16. The gaming system of claim 8, wherein the electronic game comprises video poker.

17. A non-transitory, computer-readable medium comprising a set of instructions which, when executed by a processor, causes the processor to:

initiate an electronic game on a gaming system, wherein the electronic game is conducted on a plurality of rows and a plurality of columns of a visual representation of a grid and wherein a variable plurality of symbols are presented in the plurality of rows and the plurality of columns of the grid;

determine whether to activate a game enhancement feature of the electronic game;

in response to determining to activate the game enhancement feature of the electronic game, provide to a player of the electronic game, a visual indication that the game enhancement feature of the electronic game is activated, wherein the visual indication that the game enhancement feature is activated comprises a plurality of elements present adjacent to a side of the visual representation of the grid;

determine an outcome of the electronic game based on the variable plurality of symbols presented in the plurality of rows and the plurality of columns of the grid upon termination of the electronic game; and modify the determined outcome of the electronic game based on the variable plurality of symbols presented in the plurality of rows and the plurality of columns of the visual representation of the grid and the plurality of elements of the provided visual indication that the game enhancement feature is activated.

18. The non-transitory, computer-readable medium of claim 17, wherein determining whether to activate the game enhancement feature of the electronic game is based on a generated pseudo-random number.

19. The non-transitory, computer-readable medium of claim 17, wherein determining the outcome of the electronic game based on the variable plurality of symbols presented in the plurality of rows and the plurality of columns of the grid upon termination of the electronic game is based on the variable plurality of symbols presented in a single row of the plurality of rows and wherein modifying the determined outcome of the electronic game is based on the variable plurality of symbols presented in a single column of the plurality of columns corresponding to the provided indication that the game enhancement feature of the electronic game is activated.

20. The non-transitory, computer-readable medium of claim 17, wherein determining the outcome of the electronic game based on the variable plurality of symbols presented in the plurality of rows and the plurality of columns of the grid upon termination of the electronic game is based on the variable plurality of symbols presented in a single column of the plurality of columns and wherein modifying the determined outcome of the electronic game is based on the variable plurality of symbols presented in a single row of the plurality of rows corresponding to the provided indication that the game enhancement feature of the electronic game is activated.

* * * * *